United States Patent [19]

Bäbler et al.

[11] Patent Number: 4,517,320

[45] Date of Patent: May 14, 1985

[54] STOVING LACQUERS CONTAINING GRAPHITE

[75] Inventors: Fridolin Bäbler, Marly, Switzerland; Adolf Weissmüller, Kandern, Fed. Rep. of Germany

[73] Assignee: Ciba-Geigy Corporation, Ardsley, N.Y.

[21] Appl. No.: 520,931

[22] Filed: Aug. 8, 1983

[30] Foreign Application Priority Data

Aug. 20, 1982 [CH] Switzerland ............... 4981/82

[51] Int. Cl.$^3$ .............................................. C08K 3/04
[52] U.S. Cl. ........................... 523/215; 523/468; 523/512; 524/88; 524/597; 524/611; 524/612; 252/511
[58] Field of Search ............... 252/511; 523/215, 468, 523/512; 524/88, 512, 496, 611, 597, 612

[56] References Cited

U.S. PATENT DOCUMENTS

| | | | |
|---|---|---|---|
| 2,875,076 | 2/1959 | Suchow | 106/148 |
| 3,089,849 | 5/1963 | Linson | 252/511 |
| 3,099,578 | 7/1963 | Hunter | 252/511 |
| 3,446,769 | 5/1969 | Opipari | 524/512 |
| 3,671,476 | 6/1972 | Terai et al. | 524/512 |
| 3,901,840 | 8/1975 | Irvin et al. | 524/512 |
| 3,907,717 | 9/1975 | Hebert | 252/508 |
| 4,017,448 | 4/1977 | Panush | 524/88 |
| 4,081,423 | 3/1978 | Hardenfelt . | |
| 4,170,486 | 10/1979 | Doppler . | |
| 4,180,489 | 12/1979 | Andrew et al. . | |
| 4,250,242 | 2/1981 | Doering | 430/141 |
| 4,267,229 | 5/1981 | Knight et al. | 524/88 |
| 4,268,547 | 5/1981 | Backhouse . | |
| 4,276,212 | 6/1981 | Khanna et al. | 524/512 |
| 4,358,510 | 11/1982 | Ito et al. | 524/512 |

FOREIGN PATENT DOCUMENTS

| | | | |
|---|---|---|---|
| 2044780 | 10/1980 | United Kingdom | 524/512 |
| 2085001 | 4/1982 | United Kingdom . | |
| 668934 | 6/1979 | U.S.S.R. | 524/88 |
| 855740 | 8/1981 | U.S.S.R. | 252/511 |

OTHER PUBLICATIONS

Derwent Abst. 51395 E/25 (5-1982) Chugoku J57078464.
Derwent Abst. 12877 E/07 (1-1982) Dainippon Printing J57003870.
Derwent Abst. 23218 E/12 (2-1982) Horino, K. J57028175.
Derwent Abst. 82828 A/46 (10-1978) Toyota Motor J53115757.
Derwent Abst. 15991 K/07 (1-1983) Matsushita J58001833.
Derwent Abst. 16251 K/07 (1-1983) Matsushita J58003135.
Derwent Abst. 67337 Y/38 (8-1975) Teijin, K.K. J50110474.
Derwent Abst. 39130 B/21 (3-1979) Rother, J. DL-134777.
S. B. Seeley, Graphite, Pigment Handbook, vol. 1, New York, 1973, pp. 745-756, I. Orogin, Color Engineering, 5, 20 (1967).
Hans Kittel, "Lehrbuch der Lacke und Beschichtungen" Band II, (1974), pp. 245-249, 436-442.
Encyclopedia of Polymer Sci. & Tech., vol. 10, John Wiley, New York (1969), pp. 193-209.

Primary Examiner—Herbert J. Lilling
Attorney, Agent, or Firm—Luther A. R. Hall

[57] ABSTRACT

Stoving lacquer coatings containing 0.001 to 30% by weight of one or more organic pigments or polymer-soluble dyes, and 0.001 to 30% by weight, relative to the dry lacquer coating, are suitable for obtaining metallic effects of high purity.

12 Claims, No Drawings

STOVING LACQUERS CONTAINING GRAPHITE

It has been found that in the production of dyed stoving lacquers, an even very fine metallic effect of high purity can be produced by the addition of graphite. This is all the more surprising since, as is known, dull dyeings having a smeared appearance are normally obtained with graphite. On account of the good covering power of the graphite, very thin lacquer coatings can be produced. Graphite is obtainable in a high degree of fineness without any particular effort, and does not settle out in the lacquer coating, so that the lacquered substrate has good storage properties. The addition of graphite is very economical, toxicologically safe and impairs neither the storage stability of the lacquer nor its fastness to heat, light and weather. Graphite is very readily dispersible in lacquers and has on these in no way a decomposing action.

The invention thus relates to a stoving lacquer effect coating containing 0.001 to 30% by weight of one or more organic pigments or polymer-soluble dyes, and 0.001 to 30% by weight of graphite, relative to the dry lacquer coating.

Suitable as stoving lacquers are the customary binders which react at elevated temperature, for example: acrylic, alkyd, epoxy, phenolic, melamine, urea, polyester, benzoguanamine or cellulose ester resins, or combinations thereof. The stoving lacquers commonly used in the automobile industry are preferred, such as in particular acrylic-melamine, alkyd-melamine or thermoplastic acrylic resins.

The stoving lacquer effect coating preferably has a thickness of 3–60 μm, especially 7 to 25 μm, and is as a rule single-layered.

The effect coating can be covered with one or more coats of clear lacquer. Binders preferably used for the clear lacquer are thermosetting acrylic-melamine resin combinations, such as are known in the field of motor-car lacquer finishing. The clear lacquer coating has a thickness preferably of 30 to 60 μm.

Graphites suitable for the stoving lacquers according to the invention are both natural and synthetic graphites. In the case of natural graphites, the percentage of carbon can vary greatly. Preferred are however those natural graphites of which the carbon content is at least 70%. The impurities present in natural graphite, such as silicic acid, alumina or iron oxides, can be tolerated only to the extent that they do not unfavourably affect the stability of the substrate to be dyed or the fastness properties of the other pigment or dye present. Graphites which are preferred are as a rule those having a high carbon content, particularly one of at least 99%. Synthetic graphites are therefore generally preferred.

With regard to the nature of the particles of the graphite, crystalline graphite having a particle diameter of in particular less than 100 μm is preferred. A graphite which is in flake- or lamella-form with a diameter of up to 20 μm and a thickness of up to 4 μm is especially preferably used.

The optimum optical effects can be determined by variation of the amount of graphite within the given range. An amount of 1.0 to 15.0% by weight of graphite, relative to the dry lacquer coating, is preferably used.

Suitable organic pigments are both opaque and transparent pigments. Examples of organic pigments are: azo, azomethine, methine, anthraquinone, phthalocyanine, perinone, perylene, dioxazine, thioindigo, iminoisoindoline, iminoisoindolinone, quinacridone, flavanthrone, indanthrone, anthrapyrimidine or quinophthalone pigments; also metal complexes, for example azo, azomethine or methine dyes. These pigments are particularly suitable for producing motor car lacquers.

Suitable dyes are especially phthalocyanine dyes or metal complexes of azo dyes, particularly 1:2-chromium or 1:2-cobalt complexes of monoazo dyes, also fluorescent dyes, such as those of the coumarin, naphthalimide, pyrazoline, acridine, xanthene, thioxanthene, oxazine, thiazine or benzothiazole series. Metal complexes of azo dyes are however preferred.

The stoving lacquers according to the invention contain, besides the graphite, preferably only one organic pigment or only one dye, especially an organic pigment, in particular a transparent organic pigment.

In the stoving lacquers according to the invention, the organic pigment or the dye is present preferably in amounts of 1.0 to 15.0% by weight, relative to the dry lacquer coating.

Graphite in the preferred condition with respect to the particles can be obtained in the known manner, starting with coarse-crystalline graphite, for example by grinding in air-jet, sand or ball mills. The graphite is comminuted however preferably under such conditions in which the anisotropic properties of the graphite come into play with respect to the cleavability of the layers. There are thus obtained well defined flat, lamella- or flake-like graphite particles, for example by wet-grinding coarse-crystalline graphite in a grinding device containing as grinding elements, metal, glass or porcelain balls, plastics granules or sand grains. These grinding elements are set into motion for example by rotation of the vessel, by an oscillation generator or by a stirrer.

It can be of advantage to treat the pigment, dye and/or graphite with a texture preservative before they are used for the lacquer coatings according to the invention. A graphite which has been treated with a texture preservative, for example before, during or after comminution, is preferred. Relative to the employed amount of graphite, the amount of texture preservative preferably used is 0.02 to 25% by weight.

Suitable texture preservatives are for example fatty acids having at least 12C atoms, such as stearic acid or behenic acid, or amides, salts or esters thereof, such as magnesium stearate, zinc stearate, aluminium stearate or magnesium behenate, also quaternary ammonium compounds, such as tri-($C_1$–$C_4$)-alkylbenzylammonium salts, also plasticisers, such as epoxidised soyabean oil, waxes, such as polyethylene wax, resinic acids, such as abietic acid, rosin soap, hydrogenated or dimerised colophonium, $C_{12}$–$C_{18}$-paraffin disulfonic acids, alkylphenols, alcohols, diols or polyols having at least 8C atoms.

The stoving lacquers according to the invention contain preferably a graphite treated with stearic acid, stearylamine, hydrogenated abietic acid, epoxidised soyabean oil or a 1,2-diol, especially with octanediol-(1,2) or with dodecanediol-(1,2).

For producing the stoving-lacquer effect coatings, graphite and organic pigment or dye can be dispersed individually, or premixed, by known methods into the binder. Further nonvolatile constituents can be added, such as plasticisers, auxiliaries, fillers, light stabilisers, heat stabilisers, antioxidants and inorganic pigments. The homogenised lacquer can be applied to the substrate for example by brushing, rolling, spraying, immersion or coil coating, and then stoved.

The clear lacquer coating can likewise be produced by known processes, and can contain moreover additives, such as light stabilisers and antioxidants.

A metallic effect having a fine, uniform gleaming lustre is obtained by using the finely crystalline flake- or lamellar-like graphite particles in the stoving-lacquer coating according to the invention. The metallic effect is particularly distinct when the lacquer coating according to the invention is irradiated by direct light from an artificial source or by sunlight. The light becomes partly reflected from the graphite particles present in the lacquer, an effect which is manifested in a clearly recognisable glittering, and which leads to a marked diffused scattering of light. This special lustre effect can be measured for example with a goniophotometer.

The use of graphite for the stoving lacquer coating according to the invention is economical. The resistance of graphite itself, and likewise of the stoving-lacquer coating according to the invention, to heat, light and weather is excellent; furthermore, graphite can be very readily incorporated into the carrier material, and causes negligible wear of the apparatus and a very small braking effect. By virtue of its ideal density, graphite does not settle out even after prolonged storage, and, above all, level dyeings are obtained.

The stoving-lacquer coatings with the metallic effect according to the invention are used principally for the dyeing of metal surfaces, especially in the automobile industry (motor car finishes).

Where not otherwise stated in the following Examples, the term 'parts' denotes parts by weight.

EXAMPLE 1

3 parts of LONZA graphite KS 2.5 ® and 3 parts of Cu-phthalocyanine pigment C.I. Pigment Blau 15:3 (blue) are stirred into 20 parts of solvent of the following composition: 50 parts of Solvesso ® (mixture of aromatic hydrocarbons, ESSO), 15 parts of butylacetate, 5 parts of Exkin II ® (levelling agent based on ketoxime), 25 parts of methylisobutyl ketone, 5 parts of silicone oil (1% in Solvesso 150 ®). When a completely fine dispersion has been obtained, there are added 48.3 parts of Baycryl L 530 ® (acrylic resin, 51% in xylene/butanol 3:1) and 23.7 parts of Maprenal TTX ® (melamine resin, 55% in butanol). After a short homogenisation, the lacquer is applied by spraying, and is stoved at 130° C. for 30 minutes, The lacquer coatings obtained display a metallically gleaming blue dyeing having excellent fastness properties, and are distinguished by a very good flow and exceptionally good dispersion of the pigment.

EXAMPLE 2

(a) In a glass-ball mill of 500 parts by volume capacity, 13.5 parts of synthetic LONZA graphite T-44 ® (LONZA AG) having a mean particle size of <44 μm and, as texture preservative, 1 part of REOPLAST 39 ® (CIBA-GEIGY AG) are stirred up in 125 parts of water. To the suspension are then added 400 parts by volume of glass balls having a particle diameter of 3.5–4.0 mm, and the mixture is ground for 9 hours, without external cooling, at a stirring rate of 320 r.p.m. The graphite suspension is separated from the glass balls, which are washed somewhat with water, and is subsequently filtered off. The press cake is washed with water, and dried at 70°–80° C. in a vacuum chamber.

The yield is 13.0 parts of a grey graphite which contains about 7% by weight of texture preservative, and which, after being comminuted, can be applied with fully satisfactory dispersibility in lacquers. Raster electron microscopic photographs of the graphite powder treated in the described manner show particles having a marked flake-like to lamellar-like appearance.

(b)
- 25.2 parts of Dynapol H 700 ® (60% in Solvesso 150 ® Dynamit Nobel),
- 2.7 parts of Maprenal MF 650 ® (55% in butanol, Hoechst AG),
- 15.5 parts of cellulose acetobutyrate 531.1 ® (25% in xylene/butyl acetate 1:2, Eastmen Chemical International)
- 1.1 parts of Irganol TZ6 ® (Ciba-Geigy),
- 23.3 parts of butyl acetate,
- 11.6 parts of xylene,
- 11.6 parts of Solvesso 150 ® (ESSO),
- 4.5 parts of C.I. Pigment Rot 177 (red), and
- 4.5 parts of the LONZA graphite treated according to Example 2a are well mixed in a ball mill for 96 hours, in the course of which the pigment and the graphite become finely dispersed in the lacquer medium. The lacquer is afterwards diluted with the above solvent mixture butylacetate/xylene/Solvesso to an efflux viscosity of about 18 sec. (20° C.) according to DIN 4, and thereupon applied onto a metal sheet. After a brief airing (2 minutes at about 40° C.), this pigmented first lacquer coating is covered with an unpigmented second lacquer coating consisting of:
- 58.3 parts of Viacryl VC 373 ® (60% in xylene, Vianora),
- 27.3 parts of Maprenal MF 590 ® (55% in butanol, Hoechst),
- 1.0 part of Silicone oil A ® (1% in xylene, Bayer),
- 1.0 part of Tinuvin 900 ® (Ciba-Geigy),
- 5.4 parts of xylene,
- 4.0 parts of Solvesso 150 ® (ESSO), and
- 3.0 parts of ethylene glycol acetate;

subsequently aired for 30 minutes at 40° C., and then stoved for 30 minutes at 135° C.

A metallically glittering, red lacquer having excellent fastness properties is obtained. It displays a high lustre and very good flow, as well as an extremely good dispersion of the pigment. On irradiating the lacquer coating with light from an artificial source or with sunlight, there is observed a distinct glittering which is produced by the graphite particles present in the lacquer.

What is claimed is:

1. A stoving-lacquer, which after stoving gives a coating having a thickness of 3–60 μm and with a metallic effect having a fine, uniform gleaming lustre, which consists essentially of
   (a) a thermoset acrylic resin, a thermoset alkyd resin, an epoxy resin, a phenolic resin, melamine resin, urea resin, polyester, benzoguanamine resin, cellulose ester resin or combinations thereof,
   (b) 0.001 to 30% by weight, relative to the dry lacquer coating, of one or more organic pigments or polymer-soluble dyes, and
   (c) 0.001 to 30% by weight, relative to the dry lacquer coating, of graphite with a particle diameter of less than 100 microns.

2. A stoving-lacquer according to claim 1, wherein the graphite has a carbon content of at least 99%.

3. A stoving-lacquer according to claim 1, wherein the graphite is in flake- or lamella-form with a diameter of up to 20 μm and a thickness of up to 4 μm.

4. A stoving-lacquer according to claim 1, wherein the amount of graphite is 1.0 to 15.0% by weight, relative to the dry lacquer coating.

5. A stoving-lacquer according to claim 1, wherein the organic pigment is a transparent pigment.

6. A stoving-lacquer according to claim 1, wherein the organic pigment or the dye is present in an amount of 0.1 to 15.0% by weight, relative to the dry lacquer coating.

7. A stoving-lacquer according to claim 1, wherein the organic pigment is a pigment suitable for motor car lacquers.

8. A stoving-lacquer according to claim 1, wherein the polymer-soluble dye is a 1:2-chromium or 1:2-cobalt complex of monoazo dyes.

9. A stoving-lacquer according to claim 1, wherein graphite treated with stearic acid, stearylamine, hydrogenated abietic acid, epoxidised soyabean oil or a 1,2-diol is present.

10. A stoving-lacquer according to claim 1, wherein the lacquer is an acrylic-melamine or alkyd-melamine resin.

11. A stoving-lacquer according to claim 1, which is covered with a clear lacquer coating.

12. A metal surface covered with a coating according to claim 1.

* * * * *